E. M. DALEY.
SPRING.
APPLICATION FILED SEPT. 11, 1915.
1,321,986.
Patented Nov. 18, 1919.
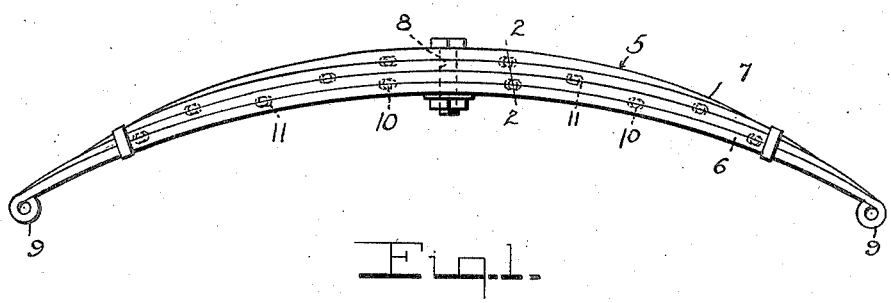
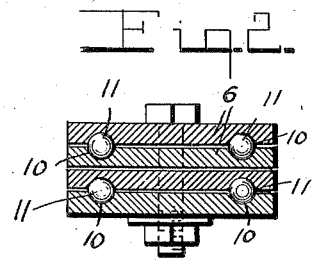
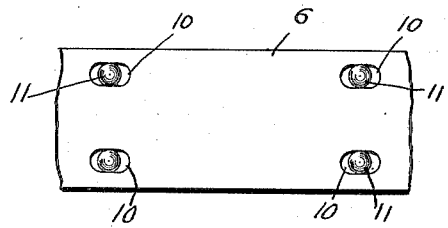
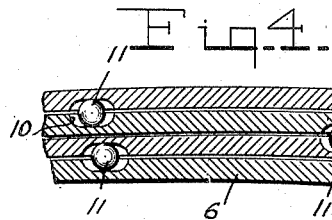
Inventor
E. M. Daley

UNITED STATES PATENT OFFICE.

EDWARD M. DALEY, OF HAVERHILL, MASSACHUSETTS, ASSIGNOR OF TWO-THIRDS TO JOHN L. PERKINS AND EDWARD J. YOUNG, OF BRADFORD, MASSACHUSETTS.

SPRING.

1,321,986.  Specification of Letters Patent.  Patented Nov. 18, 1919.

Application filed September 11, 1915. Serial No. 50,247.

*To all whom it may concern:*

Be it known that I, EDWARD M. DALEY, a citizen of the United States, residing at Haverhill, in the county of Essex and State of Massachusetts, have invented certain new and useful Improvements in Springs; and I do hereby declare the following to be a full, clear, and exact description of the invention, such as will enable others skilled in the art to which it appertains to make and use the same.

This invention relates to springs and more particularly to a novel type of spring specially designed for use in connection with motor and other vehicles.

The invention has for its primary object to increase the resiliency and general efficiency of vehicle springs by interposing bearing balls, rollers or other friction reducing elements between the leaves thereof.

Another object is the provision of a spring having bearing element containing recesses or grooves elongated on the line of relative movement of the spring leaves, thus minimizing the space between the leaves and providing reservoirs for the reception of a suitable lubricant.

With these and other objects in view, the invention consists in the novel construction, arrangement and formation of parts as will be hereinafter specifically described, claimed and illustrated in the accompanying drawing, in which:

Figure 1 represents a view in side elevation of the improved spring.

Fig. 2 represents a transverse sectional view therethrough.

Fig. 3 represents a fragmental plan view of one of the spring leaves removed, and, Fig. 4 represents a fragmentary longitudinal section through the spring.

Referring to the drawing in detail, wherein similar reference numerals designate corresponding parts throughout the several views, the numeral 5 indicates generally a spring of the usual or any preferred construction including the main spring 6 and a plurality of reinforcing elements or leaves 7 rigidly fastened centrally of the main spring 6 by a center bolt 8. The ends of the main spring 6 are, if desired, looped to provide heads 9, whereby the ends are secured in position.

The opposite surfaces of the intermediate spring leaves 7 and the inner surfaces of the upper leaf and main spring 6 are formed with a plurality of grooves 10 elongated longitudinally of the spring, and in which are arranged bearing balls 11 of adequate size to retain the leaves out of direct contact and thus relieve the same of considerable friction. The elongated shape of the grooves 10 obviously permits relative longitudinal movement of the spring leaves, as when the spring is flexed, and said spring also constitutes reservoirs for containing a suitable lubricant.

While I have here shown the friction reducing elements in the form of balls, I do not limit myself to this particular type as the balls may be obviously replaced by bearing rollers.

What I claim is:

A spring comprising a main spring, a plurality of reinforcing leaves rigidly fastened centrally of the main spring, the intermediate leaves having elongated longitudinally extending grooves in their opposite surfaces, the upper leaf and the main spring having a plurality of elongated longitudinally extending grooves in their inner surfaces in registration with the grooves in the opposed surfaces of the intermediate leaves, the grooves in the other surfaces of the intermediate leaves being in registration with each other so that all of the grooves are arranged in pairs, and bearing balls located in the pairs of grooves to reduce friction between the leaves and the spring, said grooves being of elongated formation to permit free relative longitudinal movement of the leaves when the spring and leaves are flexed.

In testimony whereof I affix my signature in presence of two witnesses.

EDWARD M. DALEY.

Witnesses:
 ADELBERT D. SPRAGE,
 CLARA BEARDSLEY.